United States Patent
Jeong et al.

(10) Patent No.: US 10,659,211 B2
(45) Date of Patent: *May 19, 2020

(54) METHOD AND APPARATUS FOR SETTING RADIO LINK OF TERMINAL IN WHICH MULTIPLE CARRIERS ARE INTEGRATED IN MOBILE COMMUNICATION SYSTEM

(71) Applicant: Samsung Electronics Co., Ltd., Suwon-si, Gyeonggi-do (KR)

(72) Inventors: Kyeong In Jeong, Hwaseong-si (KR); Gert Jan Van Lieshout, Apeldoorn (NL); Soeng Hun Kim, Suwon-si (KR); Jung Soo Jung, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/155,762

(22) Filed: May 16, 2016

(65) Prior Publication Data

US 2016/0261396 A1  Sep. 8, 2016
US 2017/0279588 A9  Sep. 28, 2017

Related U.S. Application Data

(63) Continuation of application No. 14/329,136, filed on Jul. 11, 2014, now Pat. No. 9,344,324, which is a (Continued)

(30) Foreign Application Priority Data

Nov. 11, 2009  (KR) .................. 10-2009-0108751

(51) Int. Cl.
  *G01R 31/08*  (2020.01)
  *H04L 5/00*  (2006.01)
  (Continued)

(52) U.S. Cl.
  CPC ............ *H04L 5/0098* (2013.01); *H04L 5/001* (2013.01); *H04L 41/0654* (2013.01);
  (Continued)

(58) Field of Classification Search
  CPC . H04W 72/0453; H04W 24/10; H04W 36/08; H04W 36/28; H04L 5/001; H04L 41/0654; H04L 5/0098
  (Continued)

(56) References Cited

U.S. PATENT DOCUMENTS

2006/0084441 A1  4/2006  Dowling
2008/0008212 A1  1/2008  Wang et al.
(Continued)

FOREIGN PATENT DOCUMENTS

KR  10-2007-0073338 A  7/2007
KR  10-2008-0004039 A  1/2008
(Continued)

OTHER PUBLICATIONS

3GPP TS 36.300 version 9.1.0 Release 9, p. 57-58, Section 10.1.6 Radio Link Failure, Sep. 2009.
(Continued)

*Primary Examiner* — Mang Hang Yeung
(74) *Attorney, Agent, or Firm* — Jefferson IP Law, LLP (57) ABSTRACT

A method and apparatus for configuring a radio link of a terminal communicating via aggregated carriers including a primary cell and a secondary cell are provided. The method includes detecting a Radio Link Failure (RLF) for the secondary cell, deactivating the secondary cell, and reporting at least one of a measurement result of the secondary cell and a measurement result of neighboring cell of the secondary cell to a base station. The apparatus includes a transceiver for communicating with a base station, and a controller configured to detect a RLF for the secondary cell, to (Continued)

deactivate the secondary cell, and to report at least one of a measurement result of the secondary cell and a measurement result of neighboring cell of the secondary cell to the base station.

16 Claims, 6 Drawing Sheets

Related U.S. Application Data continuation of application No. 13/509,360, filed as application No. PCT/KR2010/007908 on Nov. 10, 2010, now Pat. No. 8,817,602.

(51) Int. Cl.
*H04W 36/08* (2009.01)
*H04W 72/04* (2009.01)
*H04L 12/26* (2006.01)
*H04L 12/24* (2006.01)
*H04W 24/10* (2009.01)
*H04W 36/28* (2009.01)

(52) U.S. Cl.
CPC ......... *H04L 43/0811* (2013.01); *H04W 24/10* (2013.01); *H04W 36/08* (2013.01); *H04W 72/0453* (2013.01); *H04W 36/28* (2013.01)

(58) Field of Classification Search
USPC .................................. 370/216–221, 225–228
See application file for complete search history.

(56) References Cited

U.S. PATENT DOCUMENTS

| | | |
|---|---|---|
| 2009/0257353 A1 | 10/2009 | Song et al. |
| 2010/0113004 A1 | 5/2010 | Cave et al. |
| 2010/0240359 A1 | 9/2010 | Wu |
| 2010/0265847 A1 | 10/2010 | Lee et al. |
| 2010/0304786 A1 | 12/2010 | Ou |
| 2010/0311415 A1* | 12/2010 | Hamabe ............... H04W 24/02 455/425 |
| 2011/0081904 A1 | 4/2011 | Kuo |
| 2011/0103221 A1* | 5/2011 | Lee ....................... H04L 5/0007 370/216 |
| 2012/0202557 A1* | 8/2012 | Olofsson ............... H04W 24/08 455/525 |
| 2013/0315075 A1* | 11/2013 | Tamura ................. H04W 24/10 370/242 |

FOREIGN PATENT DOCUMENTS

| | | | | |
|---|---|---|---|---|
| WO | WO-2009048088 A1 * | 4/2009 | ............ | H04W 24/02 |
| WO | WO-2012111260 A1 * | 8/2012 | ............ | H04W 24/10 |

OTHER PUBLICATIONS

Consideration on Radio Link Failure in CA (Aug. 2009).
RLF Procedures for Carrier Aggregation (Aug. 24-24, 2009).
Radio Link Failure for Carrier Aggregation (Aug. 24-28, 2009).
ETSI TS 136 331 V8.6.0 (Jun. 2009).
Samsung, Further Consideration on RLF in CA, 3GPP TSG RAN WG2 #68, Nov. 9-13, 2009, R2-097015, Jeju Island, South Korea.

* cited by examiner

METHOD AND APPARATUS FOR SETTING RADIO LINK OF TERMINAL IN WHICH MULTIPLE CARRIERS ARE INTEGRATED IN MOBILE COMMUNICATION SYSTEM

PRIORITY

This is a continuation application of prior U.S. patent application Ser. No. 14/329,136, filed on Jul. 11, 2014, which issued as U.S. Pat. No. 9,344,324 on May 17, 2016; which is continuation of U.S. patent application Ser. No. 13/509,360, filed on May 11, 2012, which issued as U.S. Pat. No. 8,817,602 on Aug. 26, 2014, which is a National Stage application under 35 U.S.C. § 371 of an International application filed on Nov. 10, 2010 and assigned application No. PCT/KR2010/007908, which claims the benefit under 35 U.S.C. § 119(a) of a Korean patent application filed on Nov. 11, 2009 in the Korean Intellectual Property Office and assigned Ser. No. 10-2009-0108751, the entire disclosure of which is hereby incorporated by reference.

TECHNICAL FIELD

The present invention relates to a communication apparatus and method for a mobile communication system and, in particularly, to a radio link configuration method and apparatus of a terminal for communicating data with a base station over multiple carriers aggregated in a mobile communication system.

BACKGROUND

Mobile communication systems have developed to provide the subscribers with voice communication services on the move. With the rapid advance of technologies, the mobile communication systems have evolved to support high speed data communication services as well as the standard voice communication services. Recently, as the next generation mobile communication system of the 3rd Generation Partnership Project (3GPP), Long Term Evolution (LTE) is under development. The LTE system is a technology for realizing high-speed packet-based communication at about 100 Mbps, aiming at commercialization in around 2010. Meanwhile, unlike the standard voice service, most of the data services are allocated resources according to the data amount to be transmitted and channel condition. Accordingly, in the wireless communication system such as cellular communication system, it is important to manage resource allocation based on the resource scheduled for data transmission, channel condition, and data amount to be transmitted. This is the fact even in the LTE system, and the base station scheduler manages and assigns radio resources. More recent studies have focused on the LTE-Advanced (LTE-A) for improving data rate with the adaptation of several new techniques. Carrier Aggregation (CA) is one of these newly introduced techniques. As compared to the data communication in which a terminal uses one downlink and one uplink carriers, the terminal supporting CA is capable of performing data communication over multiple downlink and multiple uplink carriers.

Since the conventional radio link failure detection and recovery procedure has been designed in consideration of the terminal assigned a single downlink and a signal uplink carriers, it is impossible to adopt this procedure to the terminal which transmits and receives data on multiple aggregated uplink and downlink carriers without modification. There is therefore a need of defining an operation procedure of the CA-enabled terminal when per-carrier radio link failure is detected.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

In accordance with an aspect of the present invention, a method for configuring a radio link of a terminal communicating via aggregated carriers including a primary cell and a secondary cell is provided. The method includes detecting a Radio Link Failure (RLF) for the secondary cell, deactivating the secondary cell, and reporting at least one of a measurement result of the secondary cell and a measurement result of neighboring cell of the secondary cell to a base station.

In accordance with another aspect of the present invention, an apparatus for configuring a radio link of a terminal communicating via aggregated carriers including a primary cell and a secondary cell is provided. The apparatus includes a transceiver for communicating with a base station, and a controller configured to detect a RLF for the secondary cell, to deactivate the secondary cell, and to report at least one of a measurement result of the secondary cell and a measurement result of neighboring cell of the secondary cell to the base station.

The terminal for communicating data with a base station through multiple carriers aggregated in a mobile communication system is capable of performing radio link failure detection and recovery efficiently. That is, if radio link failure is detected on a secondary carrier other than the primary carrier among aggregated carriers and if the radio link is not recovered on the secondary carrier before expiry of a timer, the User Equipment (UE) does not perform measurement to discover a cell suitable for receiving the normal service, resulting in reduction of UE's power waste. If the probability of the radio link failure is high on the primary carrier, the UE performs measurement to discover the cell suitable for receiving the normal service on a secondary carrier so as to reduce the delay for radio link connection re-establishment when the radio link failure is detected on the primary carrier afterward.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term "primary carrier" denotes a carrier referenced for security and mobility among the carriers aggregated for use by a terminal and is interchangeably used with the term "first carrier." The term "secondary carrier" denotes at least one carrier other than the primary carrier.

Figure 1:
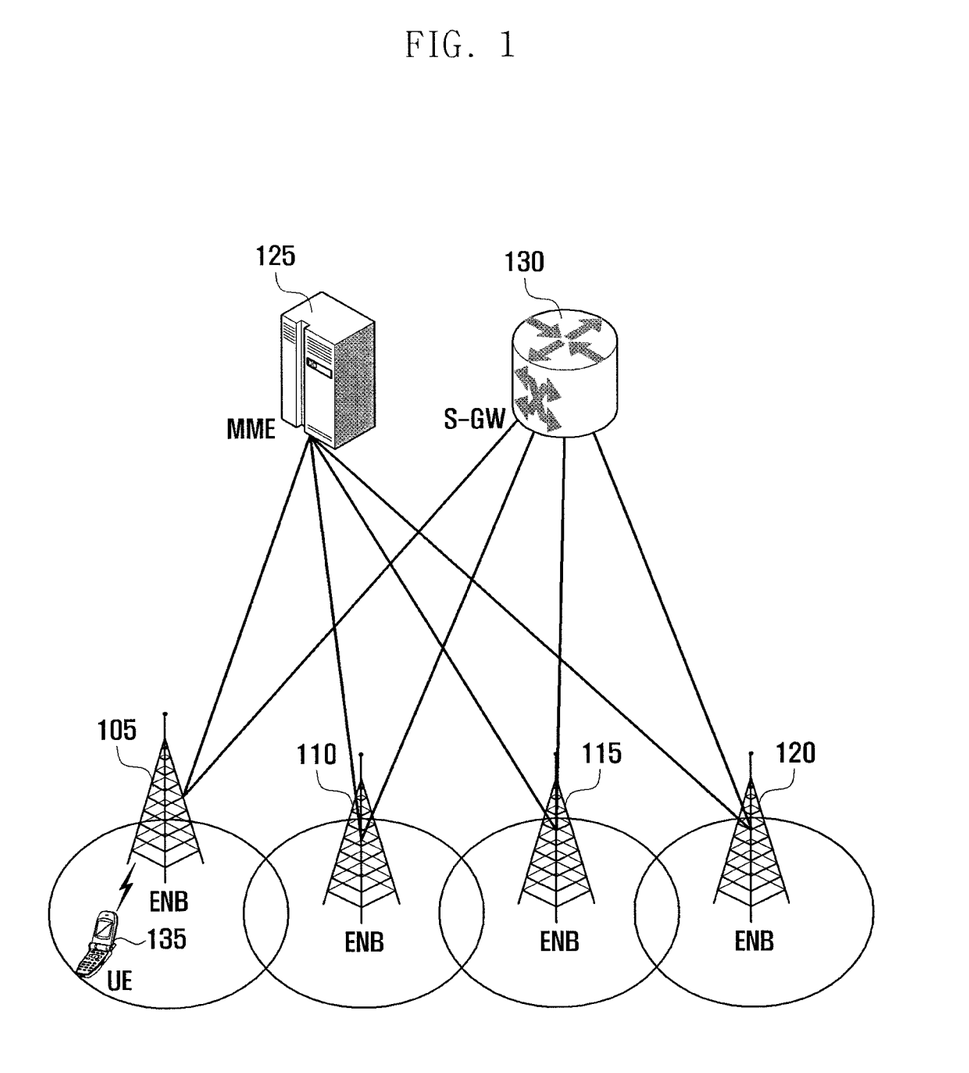
FIG. 1 is a diagram illustrating the architecture of a Long Term Evolution (LTE) system to which the present invention is applied.

FIG. 1 is a diagram illustrating the architecture of a Long Term Evolution (LTE) system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (UE) 135 connects to an external network via eNBs 105, 110, 115, and 120 and the S-GW 130. In FIG. 1, the eNBs 105, 110, 115, and 120 correspond to legacy node Bs of Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
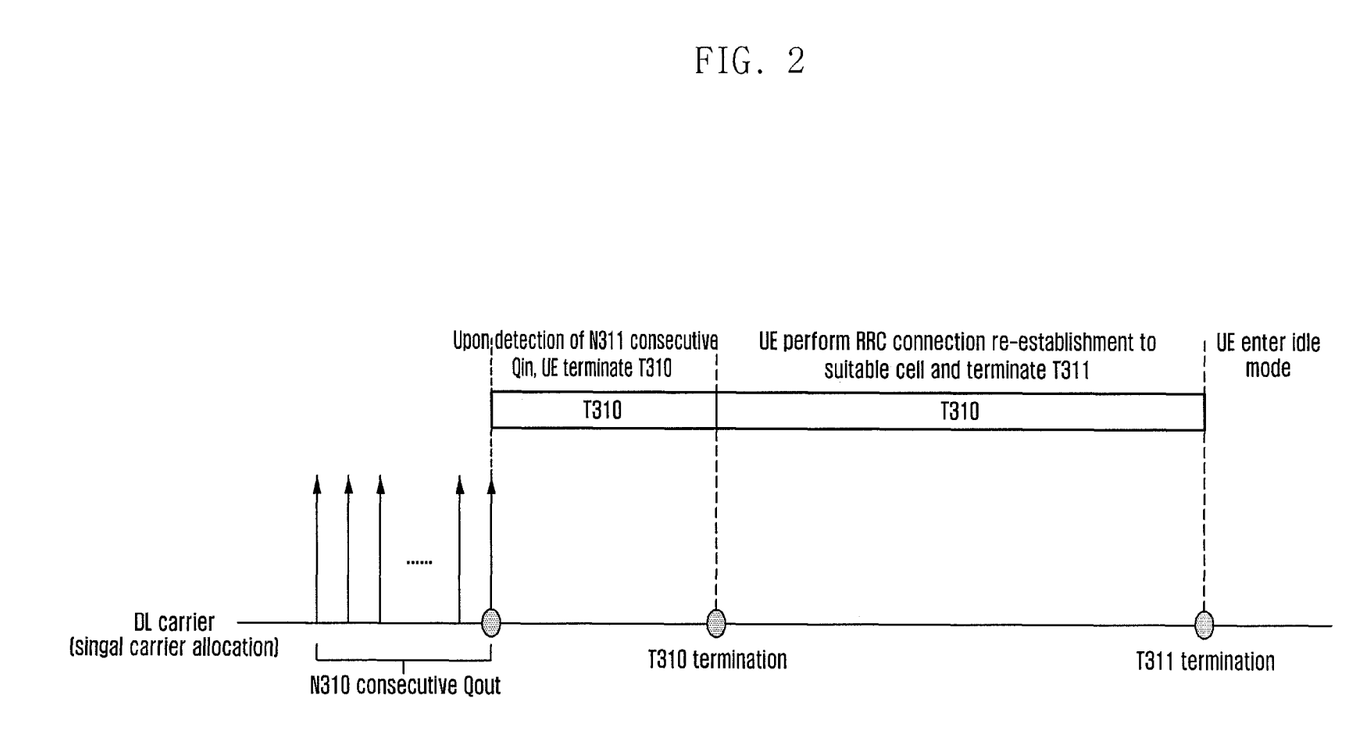
FIG. 2 is a diagram illustrating a radio link failure detection and recovery mechanism adopted in a 3rd Generation Partnership Project (3GPP) LTE system.

FIG. 2 is a diagram illustrating a radio link failure detection and recovery mechanism adopted in a 3rd Generation Partnership Project (3GPP) LTE system.

Referring to FIG. 2, the radio link failure detection is performed in such a way the UE monitors radio channel state to determine whether the connection to the eNB is broken, and the radio link recovery is performed in such a way that, when the radio link failure is detected, the UE waits for radio link recovery to the serving cell in a predetermined time rather than transitions to the idle mode immediately and, if the radio link recovery fails in the predetermined time, discovers a suitable cell for receiving the normal service among the neighbor cell to perform re-establishment procedure with the new cell. The normal service and the suitable cell for receiving the normal service follows the term 'normal service' and 'suitable cell' defined in the 3GPP standard 36.304, and the suitable cell discovery and re-establishment procedure for receiving the normal service after the radio link failure and multiple recovery failures follows 'RRC connection re-establishment procedure' defined in the 3GPP standard 36.331.

In case that a single downlink carrier is assigned to the UE, Qin or Qout information is signaled from the Physical layer to the Radio Resource Control (RRC) layer through Common Reference Signal (CRS) of the carrier. Qin is signaled when the CRS measurement result value on the carrier is greater than a predetermined reference value_1, and Qout is signaled when the CRS measurement result value on the carrier is less than a predetermined reference value_2. The CRS is the channel for measurement and channel estimation as defined in the 3GPP standard 36.211, and the RRC layer is the layer for controlling radio resource follows the Radio Link Monitoring procedure specified in the 3GPP standard 36.133.

That is, if the N310 Qout signals are sent from the physical layer to the RRC layer in sequence, the UE starts a T310 timer. If N311 Q1 signals are received from the physical layer in sequence during the T310 timer period, the UE regards that the connection to the current serving cell is recovered. The CRS managed by the UE during the T310 timer period is the signal transmitted in the serving cell to which the UE has established the RRC connection. If it fails to receive N311 Qin signals in sequence from the physical layer before the expiry of the T310 timer, the UE starts the t311 timer and search neighbor cells (including the serving cell) for a suitable cell for receiving the normal service during the T311 timer period. If a suitable cell for receiving the normal service is discovered during the T311 timer period, the UE performs RRC connection re-establishment to the found cell. If the RRC connection re-establishment is successful, the UE can continue communication of control signal/data with the reestablished target cell without necessity of transition to idle mode. If it fails to discover a suitable cell during the T11 timer period, the UE transitions to the idle mode upon expiry of the T311 timer. The values of T310, N310, T311, and N311 are signaled to the UE and determined in the ranges specified in the 3GPP standard 36.311, and the detail of the RRC connection re-establishment procedure follows the definition of the 3GPP standard 36.311 (RRC Connection Re-establishment).

Figure 3:
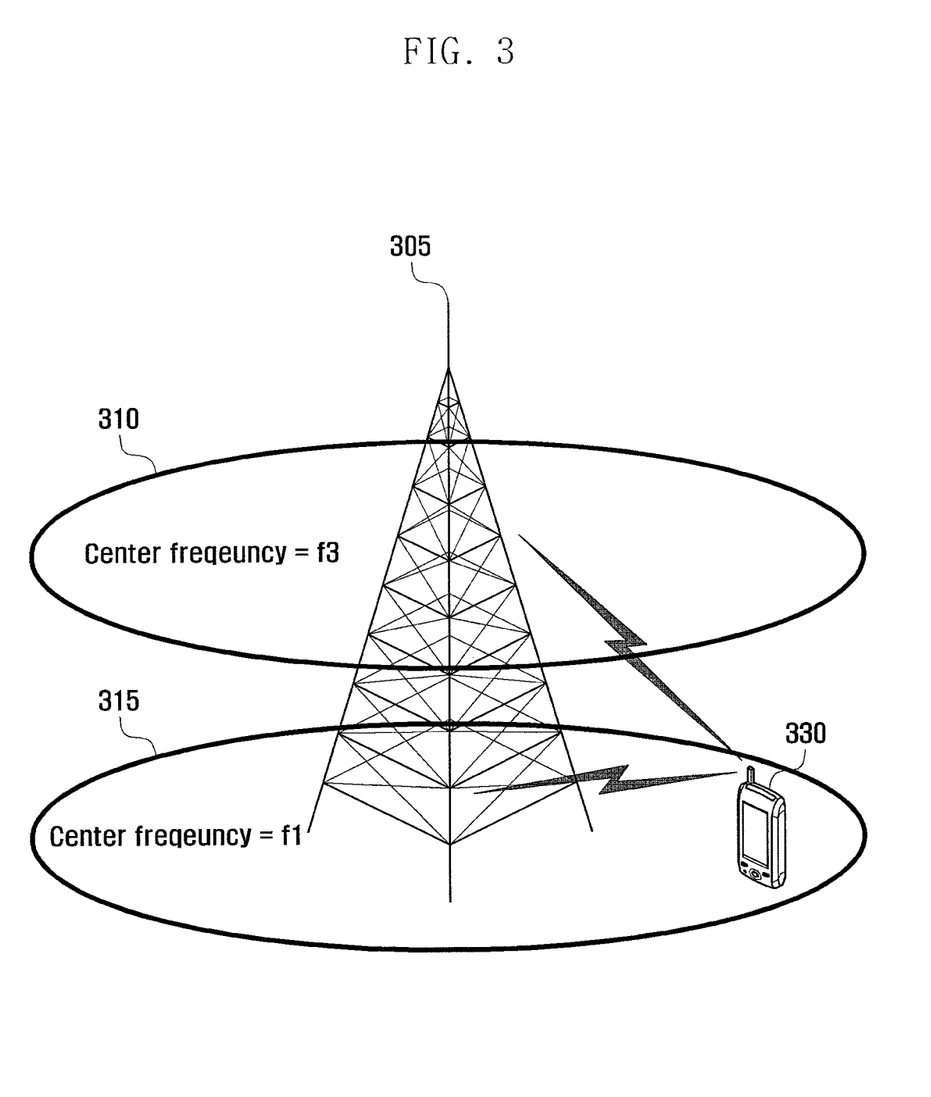
FIG. 3 is a diagram illustrating an exemplary situation of carrier aggregation in the LTE system to which the present invention is applied.

FIG. 3 is a diagram illustrating an exemplary situation of carrier aggregation in the LTE system to which the present invention is applied.

Referring to FIG. 3, typically an eNB can use multiple carriers transmitted and receive in different frequency bands. For example, the eNB 305 can be configured to use the carrier 315 with center frequency f1 and the carrier 310 with center frequency f3. If carrier aggregation is not supported, the UE 330 has to transmit/receive data unit one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE. In case that a cell is configured with one downlink carrier and one uplink carrier as a conventional concept, the carrier aggregation can be understood as if the UE communicates data via multiple cells. With the use of carrier aggregation, the maximum data rate increases in proportion to the number of aggregated carriers.

If the radio link failure detection and recovery procedure designed for the UE having single downlink carrier capability is applied to the UE 330 having multiple downlink carrier aggregation capability, the unnecessarily frequent radio link failure detection and recovery procedure is likely to cause inefficiency and thus there is a need of defining efficient radio link failure detection and recovery procedure for the UE 330 having the multiple downlink carrier aggregation capability.

The present invention proposes an efficient radio link failure detection and recovery method of a UE for receiving the data transmitted by the eNB through a plurality downlink carriers aggregated. In the present invention, the procedure begins in the state where multiple carriers are activated among the aggregated carriers and the UE has established the radio link on the respective carriers.

If radio link failure is detected on one of multiple secondary downlink carriers excluding the primary carrier representing a specific cell referenced for security and mobility, the UE waits for the recovery of the radio link with the serving cell on the secondary carrier for the timer_1 duration. At this time, the primary and secondary carriers represent the serving cell and neighbor cells of the serving cell. If radio link failure is detected in a serving cell of a different carrier, the UE may detect the radio link failure on the corresponding carrier. If the radio link failure is detected, the UE starts the timer_1 to determine whether the radio link is recovered. If the radio link is recovered before the expiry of the timer_1, the UE stops the timer_1.

If it is failed to recovery the radio link with the serving cell of other carrier before the expiry of the timer_1, the UE checks the radio quality of the primary carrier. If the radio quality of the first carrier does not satisfy a predetermined level, the terminal starts the timer_2 to discover the neighbor cells around the serving cell. That is, if the radio quality of a specific/serving cell of the primary carrier to cause radio link failure or has caused the radio link failure already, the UE starts the timer_2 on the carrier, where the timer_1 has expired, to perform a measurement operation for discovery of the suitable cell for receiving the normal service among the neighbor cells (including the serving cell. Here, if the signal indicating that the CRS measurement value on the first carrier is less than a predetermined threshold value, i.e. Qout, is detected a predetermined number of times in sequence, if the timer_1 and timer_2 start on the primary carrier, or if the radio quality of the primary carrier is less than a predetermined threshold value, the UE determines that the radio quality of the first carrier does not fulfill the radio level.

If the radio quality of the first carrier is recovered before the expiry of the timer_2, the UE stops the timer_2 and deactivates the other carrier among the plural carriers.

At this time, the timer_2 may be ended, when the radio quality of the specific/serving cell of the primary carrier becomes good enough not to cause radio link failure, if the timer_1 starts on the primary carrier and the radio link is recovered in the specific/serving cell before the expiry of the timer_I, or if the timer_2 starts on the primary carrier and a suitable cell for receiving the normal service is discovered among the neighbor cells (including the serving cell). If the timer_2 is stopped, the UE reports the radio quality information on the neighbor cells (including serving cell) of the secondary carrier to the eNB (when the neighbor cell having good radio quality is discovered on the secondary carriers) or deactivates the secondary carrier and regards that the carrier is not one of the aggregated ones (when no neighbor cell having good radio quality is detected on the carrier).

Meanwhile, if the radio quality of the primary carrier fulfills a predetermined radio quality at the time point when the timer_1 has expired on a secondary carrier but not the primary carrier, the UE deactivates the secondary carrier among the multiple carriers. That is, if the radio quality of the specific/serving cell of the primary carrier is good enough so as not to cause radio link failure, the UE deactivates the secondary carrier on which the timer_1 is terminated and regards the carriers as one of the aggregated carriers.

The timer_1 and timer_2 may be new timers set to the values different from those of the timers T310 and T311 described with reference to FIG. 2 without exclusion of reuse of the timers T310 and T311.

The above-described operation may be applied when the secondary carrier on which radio link failure is detected is a solitary carrier with the exception of the primary carrier in the aggregation. If multiple secondary carriers exist in the aggregation with the exception of the primary carrier and if radio link failure is detected on one of the secondary carriers, the UE waits for the radio link recovery with the serving cell of the secondary carrier before the expiry of the timer_1 and, if the timer_1 expires without radio link recovery, the UE deactivates the secondary carrier and excludes the carrier from the aggregation.

According to the proposed method, if radio link failure is detected on a secondary carrier but not the primary carrier and if the radio link is not recovered in the serving cell of the secondary carrier before the expiry of the timer_1, the UE skips performing measurement operation for discovering a suitable cell to receive the normal service, thereby minimizing power waste of the UE. In case that the probability of radio link failure is high on the primary carrier, the UE performs measurement operation to discover a suitable cell for receiving the normal service on the secondary carrier in advance so as to reduce the delay for the RRC connection re-establishment when the radio link failure is detected on the primary carrier afterward.

Figure 4:
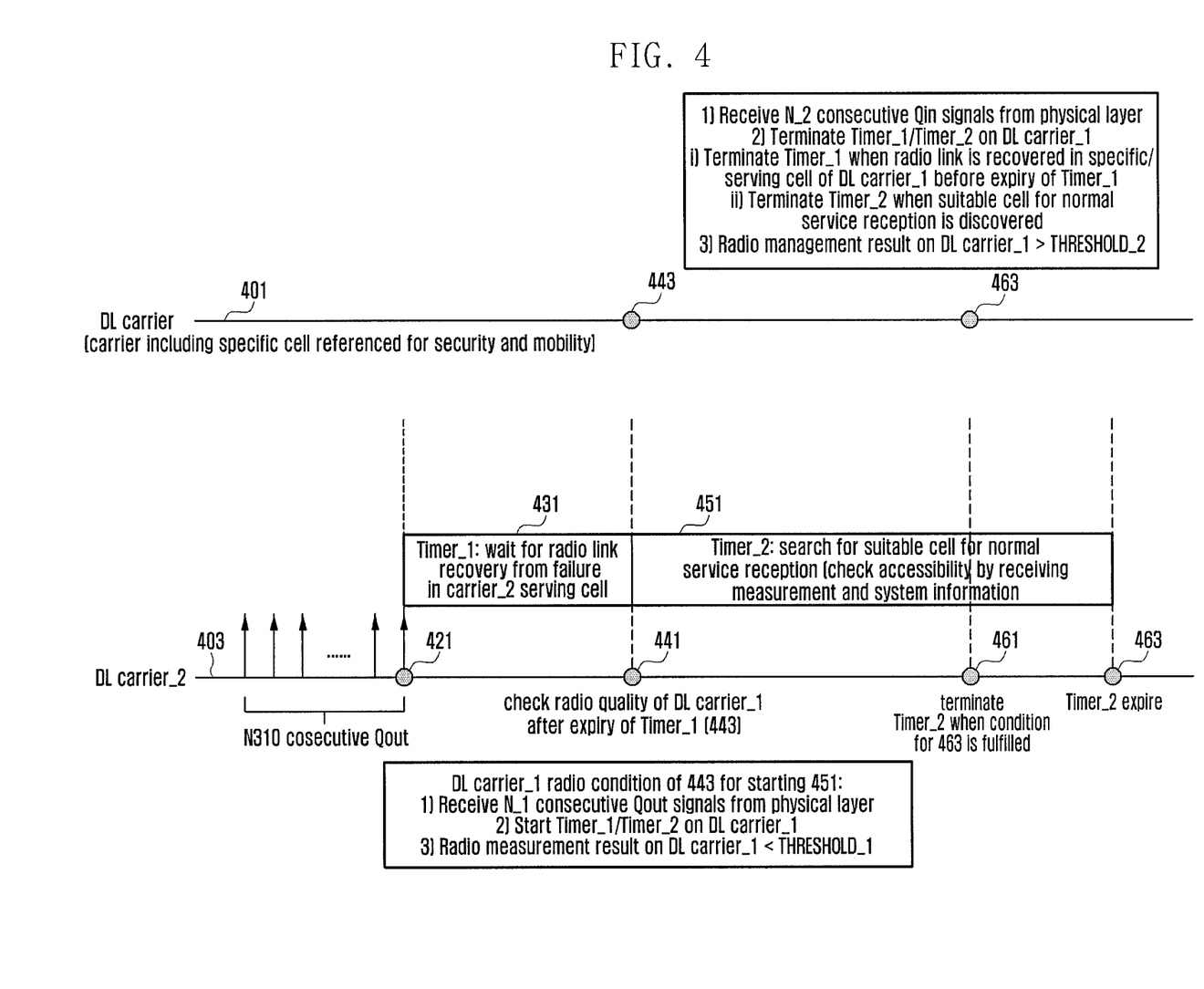
FIG. 4 is a diagram illustrating a radio link failure detection and recovery method of a Carrier Aggregation (CA)-enabled User Equipment (UE) according to an embodiment of the present invention.

FIG. 4 is a diagram illustrating a radio link failure detection and recovery method of the Carrier Aggregation (CA)-enabled UE according to an embodiment of the present invention.

Referring to FIG. 4, it is assumed that the downlink carrier_1 401 is the primary carrier including a specific cell referenced for security and mobility. The downlink carrier_2 is a secondary carrier aggregated for use by the UE. In this embodiment, it is assumed that the carrier_1 401 and carrier_2 403 are aggregated for use by the UE.

In this embodiment, if N310 Qout signals are issued in sequence from the physical layer to the RRC layer for the carrier_2 403, the UE starts timer_1 at step 421. Before the expiry of the timer_1, the UE waits for radio link recovery with the serving cell on the carrier_2 403 at step 421. The radio link recovery may be performed in the same way as the radio link recovery procedure with T310 as described with reference to FIG. 2.

If the timer_1 expires (i.e. if radio link recovery with the serving cell fails on the carrier_2 403 before the expiry of the timer_1), the UE detects the radio link recovery failure at step 441 and checks the radio quality of the carrier_1 401 including the specific cell responsible for the security and mobility at step 443. If the radio quality of the carrier_1 401 is bad to cause radio link failure afterward, the UE starts the timer_2. Whether the radio quality of the carrier_1 401 is bad to cause radio link failure afterward may be determined depending on the following conditions:

i) if N_1 consecutive Qout signals issued from the physical layer to the RRC layer for the carrier_1 401, ii) if the timer_1 or timer_2 starts on the carrier_1 401 (timer_1 starts when N310 consecutive Qout signals are received from the physical layer on the carrier_1 401, and the timer_2 starts when the timer_1 has started but the radio link to the specific/serving cell is not recovered on the carrier_1 401 before the expiry of the timer_1 401), and iii) the radio measurement result on the carrier_1 401 is less than a predetermined threshold (THRESHOLD_1). That is, if the above conditions are fulfilled, the UE starts the timer_2 on the carrier_2 403.

The UE searches for a suitable cell for receiving the normal service (perform measurement and check accessibility to the cell with the receipt of system information) before the expiry of the timer_2 at step 451.

If the radio quality of the carrier_1 401 is improved such that no radio link failure is detected before the expiry of the timer_2 on the carrier_2 403 at step 451 or if radio link failure is detected on the carrier_1 401 but recovered soon, the UE detects this at step 463 and terminates the timer_2 at step 461. At this time, the recovery of the radio quality of the carrier_1 401 may be determined when the following conditions are fulfilled:

i) N_2 consecutive Qin signals are issued from the physical layer to the RRC layer, ii) the timer_1 or timer_2 running on the carrier_1 401 is terminated (timer_1 termination occurs when the radio link is recovered in the specific/serving cell on the carrier_1 401 before the expiry of the timer_1 (the radio link is recovered when the N311 consecutive Qin signals are received from the physical layer as described with reference to FIG. 2), and the timer_2 determination occurs when a suitable cell for receiving the normal service is discovered before the expiry of the timer_2), and iii) the radio measurement result on the carrier_1 401 is greater than a predetermined threshold_2.

If the timer_2 is terminated at step 461 or if the timer expires at step 463, the UE reports the radio quality information of the neighbor cells (including serving cell) to the eNB (e.g. when a neighbor cell having good radio quality on the carrier_2) or deactivates the carrier_2 and excludes the carrier from the aggregation (e.g. when no neighbor cell having the radio quality good enough on the carrier_2).

At this time, the timer_1 and timer_2 may be defined as new timers apart from the T310 and T311 as shown in FIG. 2 but it is not ruled out to reuse the T310 and 311. Although the description is directed to the embodiment in which two downlink carriers are aggregated, the present invention is not limited thereto. That is, the present invention is applicable as follows:

1) when a plurality of secondary carriers exists among the aggregated carriers and the radio link failure is detected on one of the secondary carriers other than the primary carrier.

2) when the carrier on which the radio link failure is detected is one secondary carrier other than the primary carrier (when there are multiple secondary carriers and the radio link failure is detected on the secondary carrier other than the primary carrier, the UE waits for the radio link recovery to the serving cell of the secondary carrier before the expiry of the timer_1; and if the radio link is not recovered before the expiry of the timer_1 with the serving cell of the secondary carrier, the UE deactivates the secondary carrier and excludes the secondary carrier from the aggregation).

Figure 5:
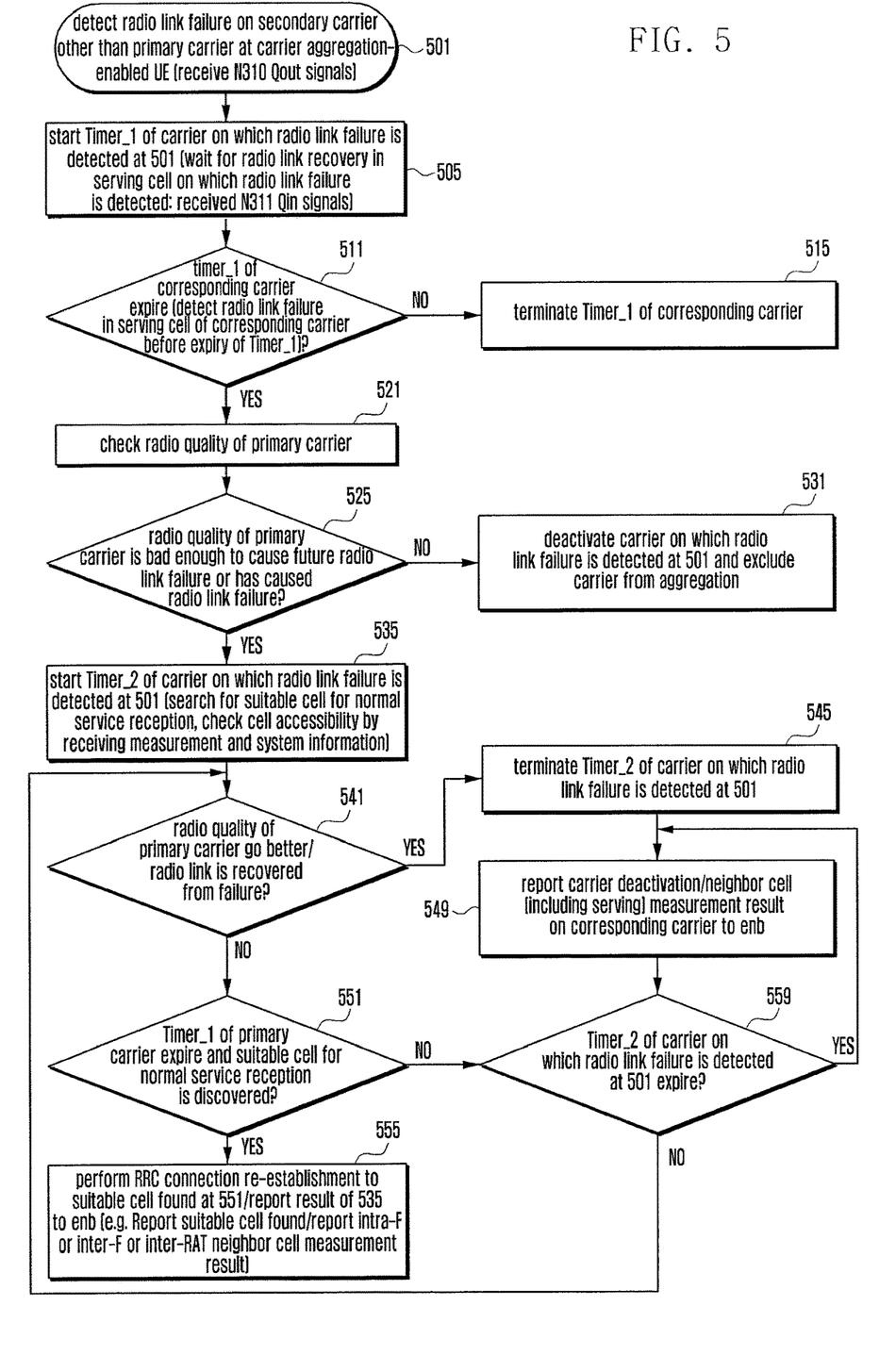
FIG. 5 is a flowchart illustrating a UE procedure according to an embodiment of the present invention.

FIG. 5 is a flowchart illustrating the UE procedure according to an embodiment of the present invention.

Referring to FIG. 5, the UE detects radio link failure on a secondary carrier other than the primary carrier among a plurality of aggregated carriers at step 501. At this time, if N310 consecutive Qout signals are issued from the physical layer, the UE can detect the radio link failure. Afterward, the UE starts the timer_1 of the secondary carrier on which the radio link failure is detected at step 505. At this time, the UE waits for the radio link recovery in the serving cell of the secondary carrier on which the radio link failure is detected. If N311 consecutive Qin signals are issued from the physical layer, the UE determines that the radio link is recovered in the serving cell of the secondary carrier. If the timer_1 of the secondary carrier expires (i.e. if the radio link recovery fails in the serving cell of the secondary carrier before the expiry of timer_1), the UE detects this at step 511 and checks the radio quality of the primary carrier at step 521. If the expiry of the timer_1 of the secondary carrier on which the radio link failure is detected is not detected at step 511 but the radio link is recovered in the serving cell of the secondary carrier before the expiry of the timer_1, the UE terminates the timer_1 of the secondary carrier at step 515.

Next, the UE determines whether the radio quality of the primary carrier is bad enough to cause the radio link failure afterward or has caused the radio link failure already at step 525 according to the radio link quality check result on the primary carrier at step 521. At this time, the UE may compare the radio quality of the primary carrier with a threshold value. For example, if the radio quality of the primary carrier is less than the threshold value, the UE may determine that the radio quality of the primary carrier is bad enough to cause radio link failure afterward or has caused radio link failure on the primary carrier. If it is determined that the radio quality of the primary carrier is bad enough to cause radio link failure afterward or has caused radio link failure on the primary carrier at step 525, the UE starts the timer_2 of the secondary carrier, at step 535, on which the radio link failure has been detected. The UE searches for a suitable cell for receiving the normal service before the expiry of the timer_2. This operation includes measurement and cell access check with the receipt of the system information. Since the determination conditions for use at step 525 have been described already with reference to FIG. 4, detailed description thereon is omitted herein. If the radio quality of the primary carrier does not satisfy the conditions at step 525, the UE deactivates the secondary carrier on which the radio link failure has been detected and excludes the deactivated carrier from the aggregation.

If the radio quality of the primary goes better or if the radio link failure has been detected but recovered soon, the UE detects this at step 541 and terminates the timer_2 of the secondary carrier on which the radio link failure has been detected at step 545. Next, the UE deactivates the secondary carrier and/or reports the measurement result on the neighbor cells of the secondary carrier (including serving cell) to the eNB at step 549. Since the exemplary determination conditions available at step 541 have been described with reference to FIG. 4, detailed description thereon is omitted herein.

The UE determines whether the timer_1 of the primary carrier has expired and a suitable cell for receiving the normal service is discovered during the operation of step 535 at step 551. If a suitable cell is discovered at step 551, the UE performs RRC connection re-establishment to the suitable cell at step 555 or reports the result of step 535 (e.g. the information on the suitable cell discovered at step 535 or intra-frequency/inter-frequency/inter-Radio Access Technology neighbor cell measurement result) to the eNB at step 555. If no suitable cell is discovered at step 551 and the timer_2 of the secondary carrier on which the radio link failure has been detected expires, the UE detects this at step 559 and deactivates the secondary carrier or reports the neighbor cell (including serving cell) measurement result on the secondary carrier to the eNB at step 549.

Figure 6:
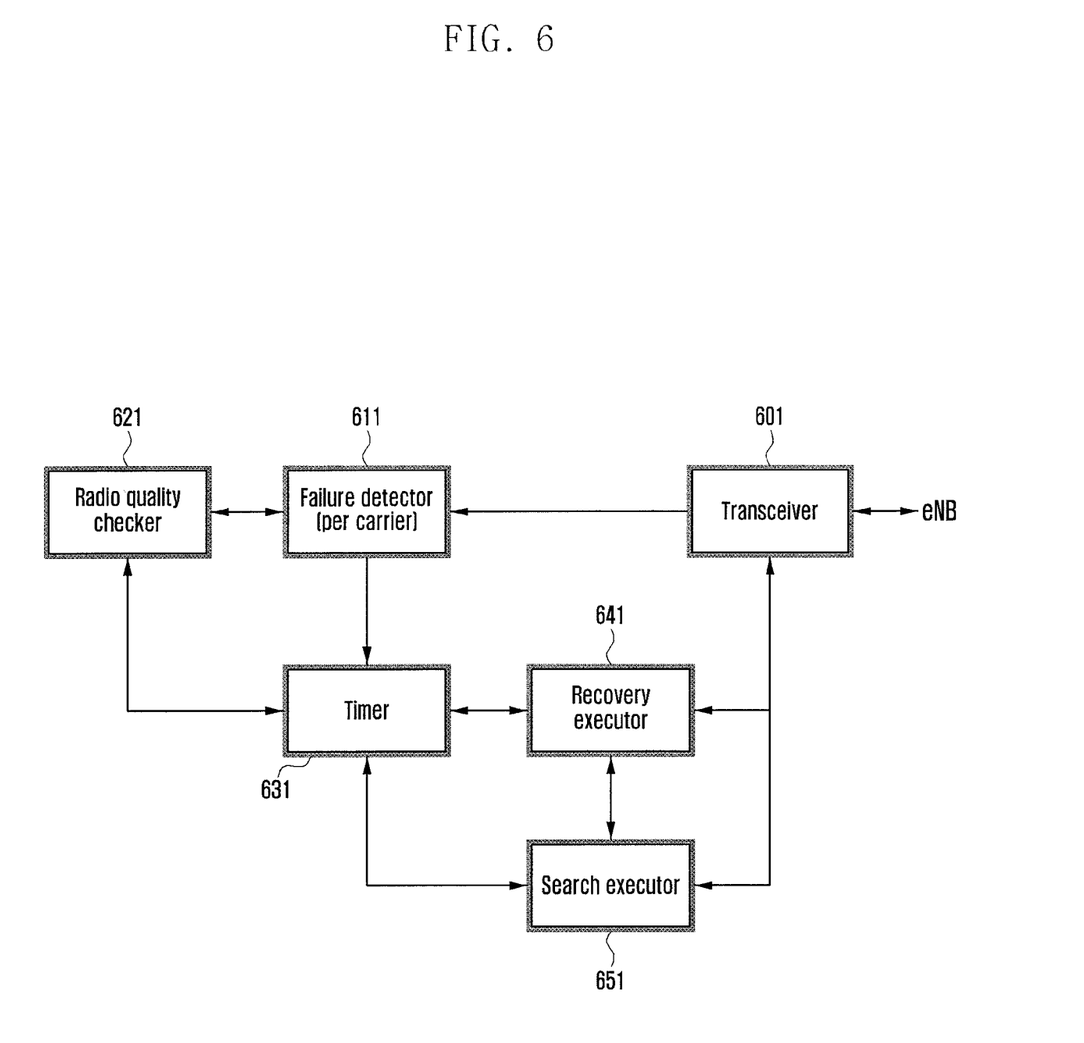
FIG. 6 is a block diagram illustrating a configuration of a UE according to an embodiment of the present invention.

FIG. 6 is a block diagram illustrating a configuration of the UE according to an embodiment of the present invention.

Referring to FIG. 6, the UE according to this embodiment includes a transceiver 601, a failure detector 611, a radio quality checker 621, a timer 631, a recovery executor 641, and search executer 651.

The transceiver 601 configures the carrier aggregation of a plurality carriers for communication with the eNB and radio links in the mobile communication and communicates data with the eNB. For this purpose, the transceiver 601 measures CRS and transmits and receives control information and data. The failure detector 611 uses the CRS measurement value as the input information for detecting radio link failure and performs radio link failure detection per carrier in carrier aggregation mode. If the failure detector 611 detects radio link failure on a secondary carrier other than the primary carrier, the timer 631 starts timer_1. The recovery executer 641 waits for radio link recovery on the secondary carrier where the radio link failure has been detected before the expiry of timer_1. If the radio link is recovered in the serving cell of the secondary carrier before the expiry of the timer_1, the timer 631 terminates the timer_1. If the radio link is not recovered in the serving cell of the secondary carrier before the expiry of the timer_1 of the timer 631, the radio quality checker 621 checks the radio quality of the primary carrier. If the radio quality of the primary carrier is greater than a threshold value, the recovery executor 641 deactivates the secondary carrier in the aggregation.

Otherwise, if the radio quality of the primary carrier is less than the threshold value, the timer 631 starts timer_2 on a secondary carrier other than the primary carrier where the radio link failure has been detected or the recovery executor 641 deactivates the secondary carrier immediately without start of timer_2 and excludes the secondary carrier from the aggregation. If the timer_2 starts on the secondary carrier, the search executor 651 takes an action for discovery a suitable cell to receive the normal service. If the radio quality checker 621 detects that the radio quality of the primary carrier goes better to be greater than the threshold value or the radio link is recovered from the radio link failure on the secondary, the timer 631 terminates the timer_2. If the timer is terminated, the search executor 651 may terminate the suitable cell discovery operation for receiving the normal service. If the timer_2 starts on the primary carrier while discovering a cell suitable for the normal service before the expiry of the timer_2, the recovery executor 641 performs RRC connection re-establishment to the suitable cell immediately or reports the measurement result of the suitable cell discovered before the expiry of the timer_2 or the neighbor cell to the eNB.

That is, the transceiver 601 configures a radio link in one of serving cells on a plurality of carriers aggregated. If the failure detector 611 detects radio link failure, the radio quality checker 621 checks the radio quality of the primary carrier. If radio link failure is detected, the timer 631 starts timer_1, and the radio quality checker 621 may determine whether the radio link is recovered. If the radio link is recovered before the expiry of the timer_1, the timer 631 terminates the timer_1 and, otherwise, if the radio link is not discovered, the radio link checker 621 may check the radio quality of the primary carrier.

If the radio link checker 621 determines that the radio quality of the primary carrier does not fulfill a predetermined radio condition, the timer 631 starts timer_2, and the search executor 641 searches neighbor cells around the serving cell. If the radio quality of the primary carrier is recovered before the expiry of the timer_2, the timer 631 terminates the timer_2, and the recovery executor 641 controls to deactivate one of the aggregated carriers. If the radio quality of the primary carrier is not recovered before the expiry of the timer_2, the recovery executor 641 controls to configure the radio link in the found cell. Otherwise, if the radio link checker 621 determines that the radio quality of the primary carrier fulfills the radio condition, the recovery executor 641 controls to deactivate one of a plurality of carriers.

According to the present invention, the UE is capable of performing radio link failure discovery and recovery efficiently in carrier aggregation mode. That is, if radio link failure is detected on a secondary carrier other than the primary carrier among aggregated carriers and if the radio link is not recovered on the secondary carrier before expiry of a timer, the UE does not perform measurement to discover a cell suitable for receiving the normal service, resulting in reduction of UE's power waste. If the probability of the radio link failure is high on the primary carrier, the UE performs measurement to discover the cell suitable for receiving the normal service on a secondary carrier so as to reduce the delay for radio link connection re-establishment when the radio link failure is detected on the primary carrier afterward.

While the present invention has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal in a wireless communication system, the method comprising:

communicating on cells including a primary cell (PCell) and at least one secondary cell (SCell);
receiving, from a base station, control information related to the at least one SCell;
identifying whether a radio link failure (RLF) for the at least one SCell is detected; and
transmitting, to the base station, a report message related to the at least one SCell in response to identifying that the RLF for the at least one SCell is detected,
wherein the report message includes measurement information on at least one neighboring cell related to the at least one SCell and a measurement result related to the at least one SCell.

2. The method of claim 1, wherein the measurement information on the at least one neighboring cell comprises information on at least one measured cell on a non-serving frequency.

3. The method of claim 1, further comprising:
receiving consecutive out of sync indications for the at least one SCell;
starting a timer corresponding to the at least one SCell in response to the consecutive out of sync indications; and
detecting the RLF for the at least one SCell based on expiration of the timer.

4. The method of claim 3, further comprising:
stopping the timer based on consecutive in sync indications being received via the at least one SCell before the timer expires.

5. A method by a base station in a wireless communication system, the method comprising:
transmitting, to a terminal communicating on cells including a primary cell (PCell) and at least one secondary cell (SCell), control information related to the at least one SCell; and
receiving, from the terminal, a report message related to the at least one SCell in response to a radio link failure (RLF) for the at least one SCell being detected,
wherein the report message includes measurement information on at least one neighboring cell related to the at least one SCell and a measurement result related to the at least one SCell.

6. The method of claim 5, wherein the measurement information on the at least one neighboring cell comprises information on at least one measured cell on a non-serving frequency.

7. The method of claim 5,
wherein a timer corresponding to the at least one SCell is started based on consecutive out of sync indications received by the terminal, and
wherein the RLF for the at least one SCell is detected based on expiration of the timer.

8. The method of claim 7, wherein the timer is stopped based on consecutive in sync indications being received via the at least one SCell before the timer expires.

9. A terminal in a communication system, the terminal comprising:
a transceiver; and
a controller coupled with the transceiver and configured to:
communicate on cells including a primary cell (PCell) and at least one secondary cell (SCell),
receive, from a base station, control information related to the at least one SCell,
identify whether a radio link failure (RLF) for the at least one SCell is detected, and
transmit, to the base station, a report message related to the at least one SCell in response to identifying that the RLF for the at least one SCell is detected,
wherein the report message includes measurement information on at least one neighboring cell related to the at least one SCell and a measurement result related to the at least one SCell.

10. The terminal of claim 9, wherein the measurement information on the at least one neighboring cell comprises information on at least one measured cell on a non-serving frequency.

11. The terminal of claim 9, wherein the controller is further configured to:
receive consecutive out of sync indications for the at least one SCell,
start a timer corresponding to the at least one SCell in response to the consecutive out of sync indications, and
detect the RLF for the at least one SCell based on expiration of the timer.

12. The terminal of claim 11, wherein the controller is further configured to:
stop the timer based on consecutive in sync indications being received via the at least one SCell before the timer expires.

13. A base station in a communication system, the base station comprising:
a transceiver; and
a controller coupled with the transceiver and configured to:
transmit, to a terminal communicating on cells including a primary cell (PCell) and at least one secondary cell (SCell), control information related to the at least one SCell, and
receive, from the terminal, a report message related to the at least one SCell in response to a radio link failure (RLF) for the at least one SCell being detected,
wherein the report message includes measurement information on at least one neighboring cell related to the at least one SCell and a measurement result related to the at least one SCell.

14. The base station of claim 13, wherein the measurement information on the at least one neighboring cell comprises information on at least one measured cell on a non-serving frequency.

15. The base station of claim 13,
wherein a timer corresponding to the at least one SCell is started based on consecutive out of sync indications received by the terminal, and
wherein the RLF for the at least one SCell is detected based on expiration of the timer.

16. The base station of claim 15, wherein the timer is stopped based on consecutive in sync indications being received via the at least one SCell before the timer expires.

* * * * *